US012244624B2

(12) United States Patent
Varanda

(10) Patent No.: US 12,244,624 B2
(45) Date of Patent: *Mar. 4, 2025

(54) MALWARE DETECTION AT ENDPOINT DEVICES

(71) Applicant: Bank of America Corporation, Charlotte, NC (US)

(72) Inventor: Ricardo Varanda, Reading (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,339

(22) Filed: Oct. 16, 2023

(65) Prior Publication Data

US 2024/0039942 A1 Feb. 1, 2024

Related U.S. Application Data

(63) Continuation of application No. 17/141,685, filed on Jan. 5, 2021, now Pat. No. 11,824,878.

(51) Int. Cl.
*H04L 9/40* (2022.01)

(52) U.S. Cl.
CPC ...... *H04L 63/1425* (2013.01); *H04L 63/1433* (2013.01)

(58) Field of Classification Search
CPC ........... H04L 63/14331; H04L 63/1416; H04L 61/4511; H04L 63/10; H04L 63/1425;

(Continued)

(56) References Cited

U.S. PATENT DOCUMENTS 8,656,465 B1 * 2/2014 Fong-Jones ......... G06F 21/6281
726/17
9,465,789 B1 * 10/2016 Chen .................... G06F 40/126

(Continued)

OTHER PUBLICATIONS

Obaidat et al., "Web Browser Extension User-Script XSS Vulnerabilities," 2020 IEEE Intl Conf on Dependable, Autonomic and Secure Computing, Intl Conf on Pervasive Intelligence and Computing, Intl Conf on Cloud and Big Data Computing, Intl Conf on Cyber Science and Technology Congress (DASC/PiCom/CBDCom/CyberSciTec.*

(Continued)

*Primary Examiner* — Roderick Tolentino
(74) *Attorney, Agent, or Firm* — Banner & Witcoff, Ltd.

(57) ABSTRACT

Aspects of the disclosure relate to malware detection at endpoint devices. A computing platform may send rule information to a browser extension including a set of rules defining reportable behavior of network traffic associated with a website. Subsequently, the computing platform may receive report information including an identification of a loaded web page associated with the website that exhibits the reportable behavior defined by at least one rule of the set of rules and an indication of which rules of the set of rules have been met. Based on receiving the report information, the computing platform may assign a risk score for the identified loaded web page. Thereafter, the computing platform may determine that the risk score is above a predetermined threshold, and in response, the computing platform may send commands to the browser extension directing the browser extension to close the identified loaded web page.

20 Claims, 8 Drawing Sheets

(58) Field of Classification Search
CPC ............ H04L 63/1433; G06Q 10/0635; G06Q 20/4016; G06F 21/577; G06F 21/552; G06F 21/566
See application file for complete search history.

(56) References Cited

U.S. PATENT DOCUMENTS

| | | | | |
|---|---|---|---|---|
| 11,288,359 | B1 * | 3/2022 | Caldwell | H04L 63/083 |
| 11,301,560 | B2 * | 4/2022 | Prakash | G06F 21/552 |
| 2009/0064337 | A1 * | 3/2009 | Chien | G06F 21/564 726/25 |
| 2009/0077383 | A1 | 3/2009 | de Monseignat et al. | |
| 2010/0049975 | A1 | 2/2010 | Parno et al. | |
| 2011/0093952 | A1 | 4/2011 | Kumar et al. | |
| 2012/0131438 | A1 * | 5/2012 | Li | H04L 63/1483 715/234 |
| 2013/0061323 | A1 | 3/2013 | Liske | |
| 2013/0247030 | A1 | 9/2013 | Kay et al. | |
| 2014/0020053 | A1 | 1/2014 | Kay et al. | |
| 2014/0053267 | A1 | 2/2014 | Klein et al. | |
| 2014/0201528 | A1 * | 7/2014 | Krig | H04L 67/535 713/168 |
| 2015/0007250 | A1 | 1/2015 | Dicato, Jr. et al. | |
| 2015/0067853 | A1 | 3/2015 | Amrutkar et al. | |
| 2017/0006046 | A1 | 1/2017 | Kuskov et al. | |
| 2017/0091450 | A1 | 3/2017 | Turgeman | |
| 2017/0093839 | A1 | 3/2017 | Whiteside et al. | |
| 2017/0257393 | A1 | 9/2017 | De Barros et al. | |
| 2017/0270300 | A1 | 9/2017 | Reddington | |
| 2017/0293755 | A1 | 10/2017 | Kargman et al. | |
| 2018/0375896 | A1 | 12/2018 | Wang et al. | |
| 2020/0034530 | A1 * | 1/2020 | Zasadzinski | G06F 21/554 |
| 2020/0092333 | A1 * | 3/2020 | Sebesta | G06F 9/542 |
| 2020/0137039 | A1 | 4/2020 | Whiteside et al. | |
| 2020/0137110 | A1 | 4/2020 | Tyler et al. | |
| 2020/0151325 | A1 | 5/2020 | Chen et al. | |
| 2020/0159525 | A1 * | 5/2020 | Bhalla | G06Q 10/06313 |
| 2020/0218433 | A1 | 7/2020 | Batchelder et al. | |
| 2020/0218434 | A1 | 7/2020 | Batchelder et al. | |
| 2020/0342103 | A1 | 10/2020 | Luo et al. | |
| 2020/0356661 | A1 | 11/2020 | Stoletny et al. | |
| 2020/0389469 | A1 | 12/2020 | Litichever et al. | |
| 2020/0404019 | A1 | 12/2020 | Drake | |

OTHER PUBLICATIONS

Rodrigues et al., "Securing Instant Messages With Hardware-Based Cryptography and Authentication in Browser Extension," IEEE Access Year: 2020 | vol. 8 | Journal Article | Publisher: IEEE.*

* cited by examiner

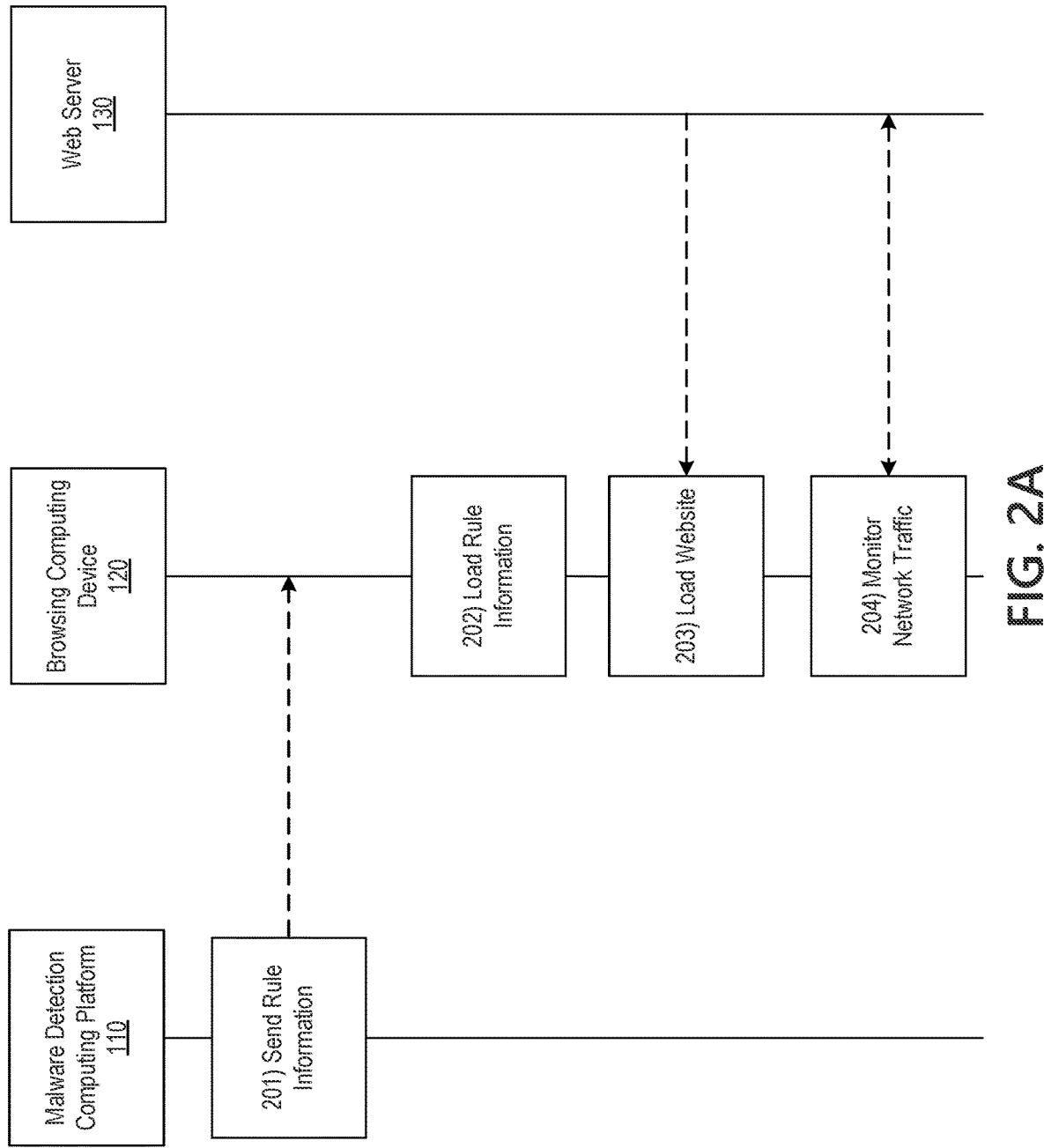

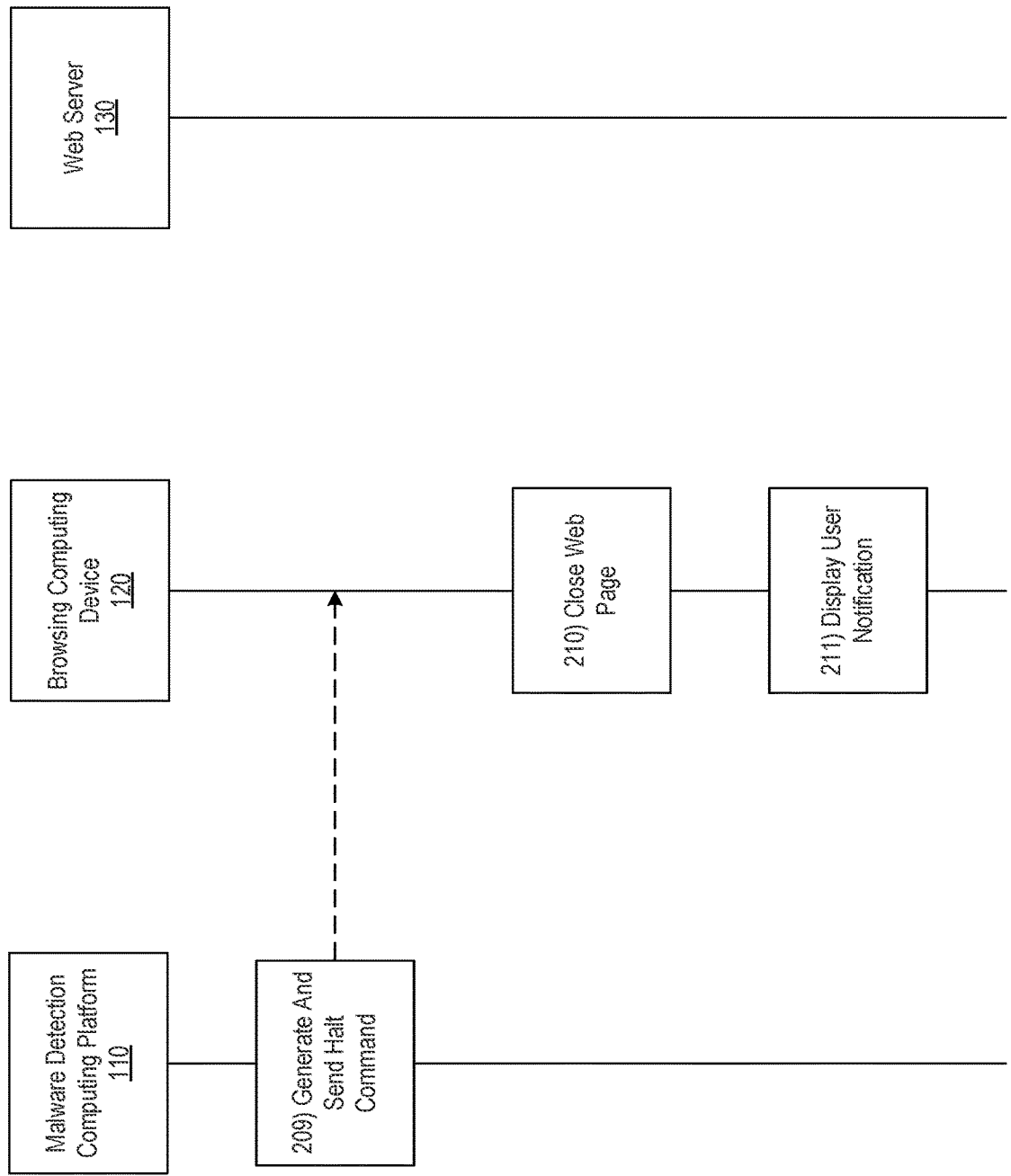

MALWARE DETECTION AT ENDPOINT DEVICES

CROSS REFERENCE TO RELATED APPLICATIONS

This application is a continuation of and claims priority to co-pending U.S. application Ser. No. 17/141,685, filed Jan. 5, 2021, and entitled, "Malware Detection at Endpoint Devices," which is incorporated herein by reference in its entirety.

BACKGROUND

Aspects of the disclosure relate to computer system security and malware detection at user endpoint devices. In particular, one or more aspects of the disclosure relate to detecting malicious software applications using a web browser extension.

Today, communications (e.g., web browser communications) associated with a variety of endpoint computing devices (e.g., personal computing devices, mobile phones, tablets, and the like) are vulnerable to exploitation. For instance, endpoint devices are routinely compromised as a result of performing seemingly innocuous activities such as loading a website. Unbeknownst to a user, for example, simply browsing a website (e.g., a third party website) may cause malicious code (e.g., spyware, computer viruses, or other malicious software or malware) to be installed or executed on the user's endpoint device. In many instances, although updates on a computer network may be performed on periodic basis, such as once per week, the window between updates may pose a security risk insofar as anti-virus software, scanning software, and the like may fail to identify malware during such a window. As such, a compromised endpoint computing device may expose a user's private and/or sensitive information (e.g., login credentials, security keys, and the like) to a third party during networked communications, such as when communicating with a server device via a web browser.

SUMMARY

Aspects of the disclosure provide effective, efficient, scalable, and convenient technical solutions that address and overcome the technical problems associated with malware detection at endpoint devices. For example, some aspects of the disclosure provide ways to efficiently detect malware in websites viewed at user endpoint devices. Additional aspects of the disclosure may leverage a web browser extension to scan for malware as web pages are loaded by a browser, rate anomalous behavior of network traffic, and take action if a web page is deemed unsafe and/or to perform other functions.

In accordance with one or more embodiments, a computing platform having at least one processor, a communication interface, and memory may send, via the communication interface, to a browser extension on a computing device, rule information including a set of rules defining reportable behavior of network traffic associated with a website. Subsequently, the computing platform may receive, via the communication interface, from the browser extension on the computing device, report information. In addition, the report information may include an identification of a loaded web page associated with the website that exhibits the reportable behavior defined by at least one rule of the set of rules in the rule information. In addition, the report information may include an indication of which rules of the set of rules have been met. Based on receiving the report information, the computing platform may assign a risk score for the identified loaded web page. Next, the computing platform may determine that the risk score is above a predetermined threshold. In response to determining that the risk score is above the predetermined threshold, the computing platform may send, via the communication interface, to the browser extension on the computing device, one or more commands directing the browser extension on the computing device to close the identified loaded web page.

In some embodiments, assigning the risk score for the identified loaded web page may include evaluating a combination of rules of the set of rules indicated as being met.

In some embodiments, the computing platform may cause the browser extension on the computing device to monitor the network traffic to and from the website.

In some embodiments, receiving the report information from the browser extension on the computing device may include receiving information indicating that the loaded web page associated with the website exhibits a similarity to a known or suspected malicious behavior defined as a reportable behavior by the set of rules.

In some embodiments, receiving the report information from the browser extension on the computing device may include receiving information indicating that the loaded web page associated with the website is connecting to a server in a high-risk country or area.

In some embodiments, receiving the report information from the browser extension on the computing device may include receiving information indicating that the loaded web page associated with the website is sending data to an unexpected or unknown destination.

In some embodiments, receiving the report information from the browser extension on the computing device may include receiving information indicating that the loaded web page associated with the website is sending data over hypertext transfer protocol (HTTP).

In some embodiments, receiving the report information from the browser extension on the computing device may include receiving information indicating that the loaded web page associated with the website is transmitting information using an unspecified security protocol.

In some embodiments, receiving the report information from the browser extension on the computing device may include receiving information indicating that the loaded web page associated with the website is setting cookies with wildcard domains.

In some embodiments, receiving the report information from the browser extension on the computing device may include receiving information indicating that the loaded web page associated with the website is using unsafe keywords.

In some embodiments, receiving the report information from the browser extension on the computing device may include receiving information indicating that the loaded web page associated with the website is using known vulnerable third-party libraries.

In some embodiments, the computing platform may cause the browser extension on the computing device to load the rule information upon startup of a browser.

In some embodiments, the computing platform may add a rule to or remove a rule from the rule information including the set of rules defining reportable behavior of network traffic associated with the website, and update the rule information based on the addition or removal of the rule.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for malware detection at endpoint devices in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
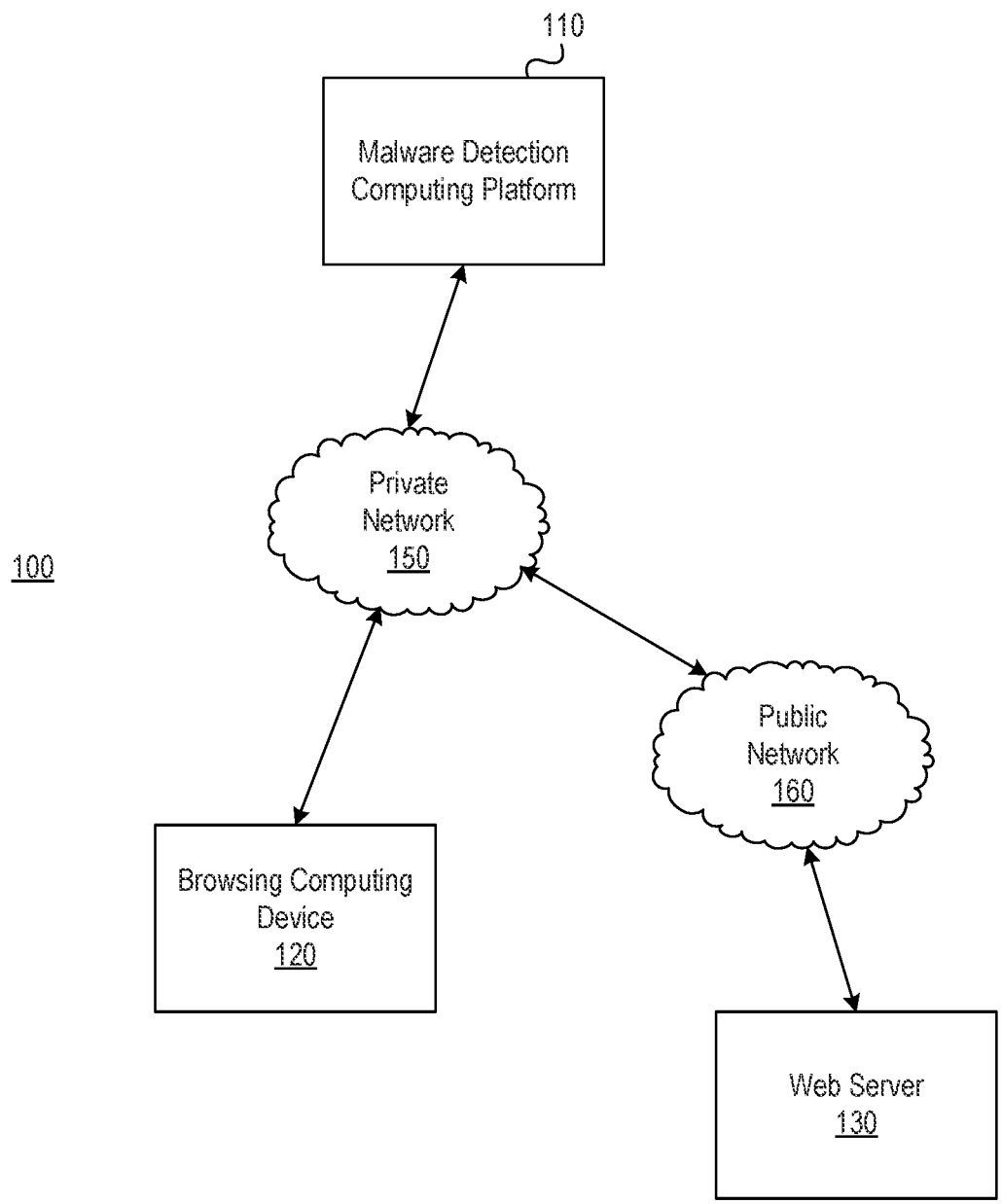
FIGS. 1A-1C depict an illustrative computing environment for malware detection at endpoint devices in accordance with one or more example embodiments.
Figure 1B:
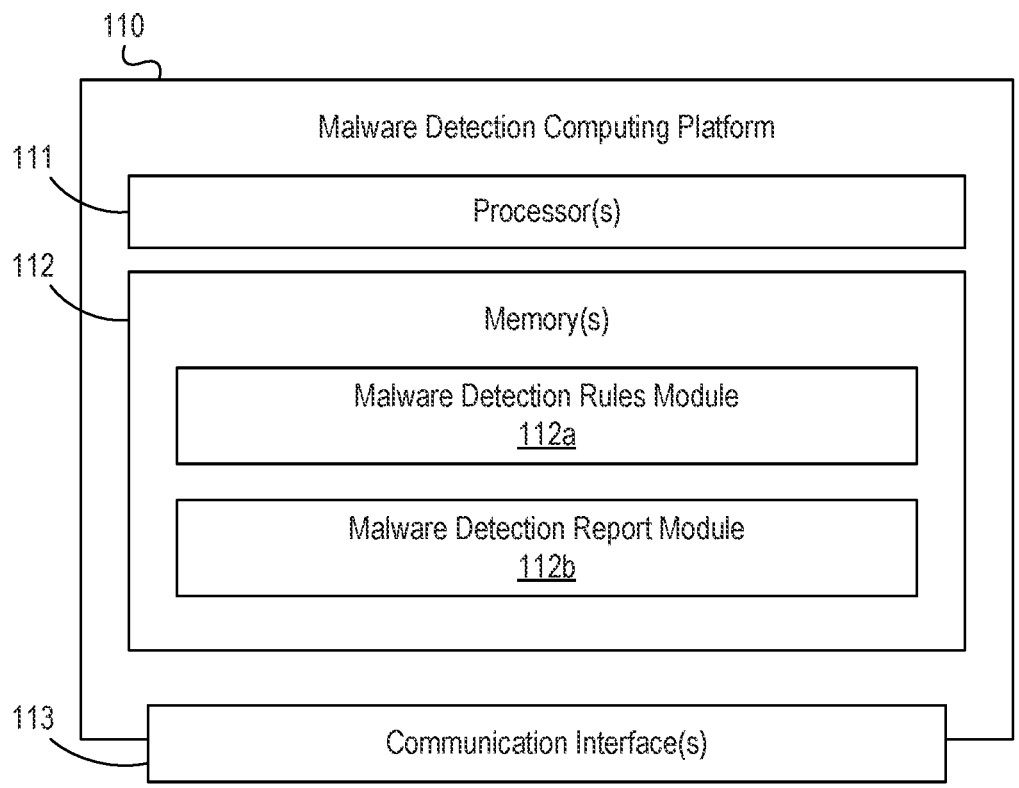
Figure 1C:
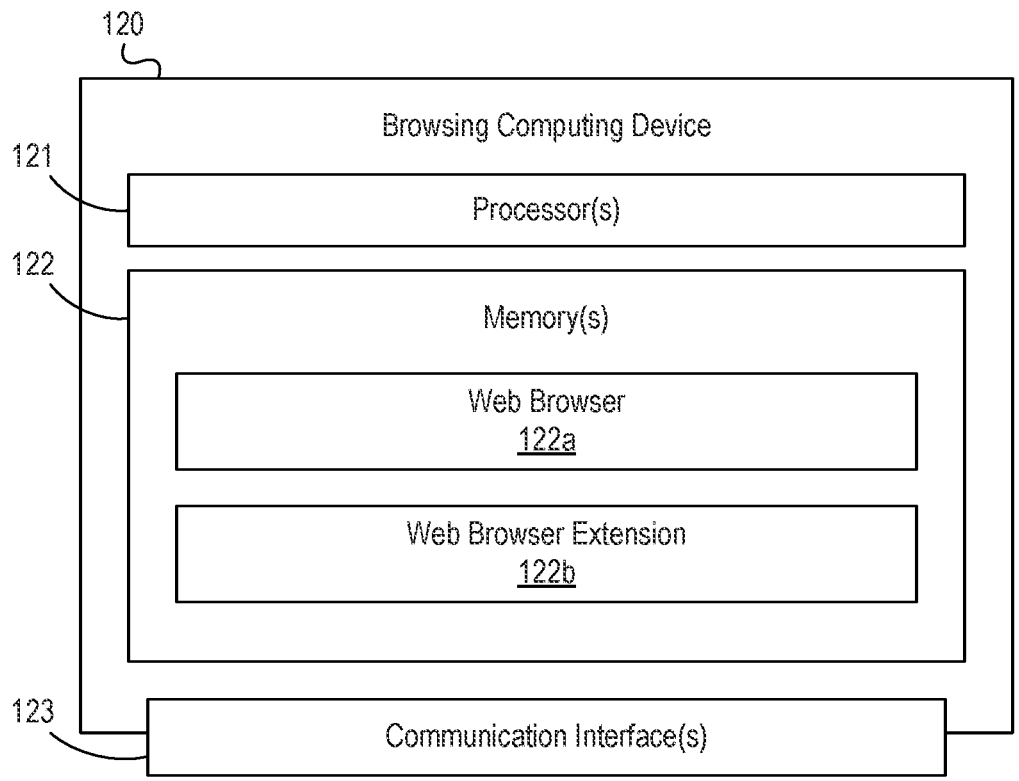

FIGS. 1A-1C depict an illustrative computing environment for malware detection at endpoint devices in accordance with one or more example embodiments. Referring to FIG. 1A, computing environment 100 may include one or more computing devices and/or other computing systems. For example, computing environment 100 may include malware detection computing platform 110, browsing computing device 120, and web server 130. Although one browsing computing device 120 is shown for illustrative purposes, any number of browsing computing devices may be used without departing from the disclosure. In addition, although one web server 130 is shown for illustrative purposes, any number of web servers may be used without departing from the disclosure.

As illustrated in greater detail below, malware detection computing platform 110 may include one or more computing devices configured to perform one or more of the functions described herein. For example, malware detection computing platform 110 may include one or more computers (e.g., laptop computers, desktop computers, servers, server blades, or the like).

Browsing computing device 120 may include one or more computing devices and/or other computer components (e.g., processors, memories, communication interfaces). For instance, browsing computing device 120 may be, for example, a desktop or laptop computer with a browser software application, a mobile device or mobile phone with Internet capability, or any computing device from which a user can access web content, or the like, and may be associated with an enterprise organization operating malware detection computing platform 110. Browsing computing device 120 may be an endpoint computing device for client-server communications between the browsing computing device 120 and a provider computing device (e.g., one or more servers 130). The browsing computing device 120 may be communicatively coupled to one or more networks 150, 160.

Web server 130 may host one or more remote services. The one or more remote services may include websites (e.g., financial websites, social media websites, e-commerce websites), applications, and/or programs. The one or more remote services may communicate using one or more communication protocols (e.g., HTTP, HTTPS, FTP, SMTP, and the like). Web server 130 may serve or host websites and provide content rendered on a web page. For example, from browsing computing device 120, a user may access web server 130 using an Internet browser, or by executing a software application that communicates with web server 130 over a computer network (e.g., such as the Internet).

Computing environment 100 also may include one or more networks, which may interconnect one or more of malware detection computing platform 110, browsing computing device 120, and web server 130. For example, computing environment 100 may include private network 150 and public network 160. Private network 150 and/or public network 160 may include one or more sub-networks (e.g., local area networks (LANs), wide area networks (WANs), or the like). Private network 150 may be associated with a particular organization (e.g., a corporation, financial institution, educational institution, governmental institution, or the like) and may interconnect one or more computing devices associated with the organization. For example, malware detection computing platform 110, browsing computing device 120, and web server 130 may be associated with an organization (e.g., a financial institution), and private network 150 may be associated with and/or operated by the organization, and may include one or more networks (e.g., LANs, WANs, virtual private networks (VPNs), or the like) that interconnect malware detection computing platform 110, browsing computing device 120, web server 130, and one or more other computing devices and/or computer systems that are used by, operated by, and/or otherwise associated with the organization. Public network 160 may connect private network 150 and/or one or more computing devices connected thereto (e.g., malware detection computing platform 110, browsing computing device 120, and web server 130) with one or more networks and/or computing devices that are not associated with the organization. For example, customer computing device 150 might not be associated with an organization that operates private network 150, and public network 160 may include one or more networks (e.g., the Internet) that connect customer computing device 150 to private network 150 and/or one or more computing devices connected thereto (e.g., malware detection computing platform 110, browsing computing device 120, and web server 130).

In one or more arrangements, malware detection computing platform 110, browsing computing device 120, and web server 130 may be any type of computing device capable of receiving a user interface, receiving input via the user interface, and communicating the received input to one or more other computing devices. For example, malware detection computing platform 110, browsing computing device 120, web server 130, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, malware detection computing platform 110 may include one or more processor(s) 111, memory(s) 112, and communication interface(s) 113. A data bus may interconnect processor 111, memory 112, and communication interface 113. Communication interface 113 may be a network interface configured to support communication between malware detection computing platform 110 and one or more networks (e.g., private network 150, public network 160, or the like). Memory 112 may include one or more program modules having instructions that when executed by processor 111 cause malware detection computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of malware detection computing platform 110 and/or by different computing devices that may form and/or otherwise make up malware detection computing platform 110. For example, memory 112 may have, store, and/or include a malware detection rules module 112a and a malware detection report module 112b. Malware detection rules module 112a may have instructions that direct and/or cause malware detection computing platform 110 to, for instance, provide rules or similar policy information from a repository to carry out malware detection and/or instructions that direct malware detection computing platform 110 to perform other functions, as discussed in greater detail below. Malware detection report module 112b may store information received from browsing computing device 120 (e.g., from web browser extension 122b) in performing malware detection and/or in performing other functions, as discussed in greater detail below.

Referring to FIG. 1C, browsing computing device (e.g., a laptop computing device, a desktop computing device, a mobile phone, a tablet, and the like) 120 may include one or more processor(s) 121, memory(s) 122, and communication interface(s) 123. A data bus may interconnect processor 121, memory 122, and communication interface 123. Communication interface 123 may be a network interface configured to support communication between browsing computing device 120 and one or more networks (e.g., private network 150, public network 160, or the like).

In some instances, browsing computing device 120 may include an installed web browser 122a. The web browser 122a may be an application stored on computer readable media device (e.g., memory 122) of the browsing computing device 120 to access information (e.g., a web page) on the World Wide Web (e.g., hosted by the one or more servers 130), for example, based on requests (and responses) via HTTP and/or HTTPS. In some instances, the browsing computing device 120 may include a web browser extension 122b such as an application (e.g., an add-on, a plugin, an extension, and the like) stored on a computer readable media device (e.g., memory 122) of the browsing computing device 120 to supplement, add, and/or otherwise modify the functionality of the web browser 122a. For example, the web browser extension 122b may include one or more computer readable instructions, when executed, to enable detection of one or more malicious applications (e.g., malware, and the like) in web pages viewed at the browsing computing device 120. The web browser extension 122b may be available in one or more configurations/versions for compatibility with one or more web browsers. The web browser extension 122b may be managed/configured by a developer and/or an enterprise organization associated with the browsing computing device 120 and/or a user of the browsing computing device 120. For example, an enterprise organization may install the web browser extension 122b on a browsing computing device 120 associated with an individual of the enterprise organization. In some embodiments, the web browser extension 122b may be installed on the browsing computing device 120 by an end user, for example, from an "app store" or application marketplace. In some embodiments, the web browser extension 122b may be installed on the browsing computing device 120 in accordance with enterprise policy and procedures. Once installed, the web browser extension 122b may register with malware detection rules module 112a and/or malware detection report module 112b in order to gain access to rules and report information, and send and/or receive other data.

Figure 2B:
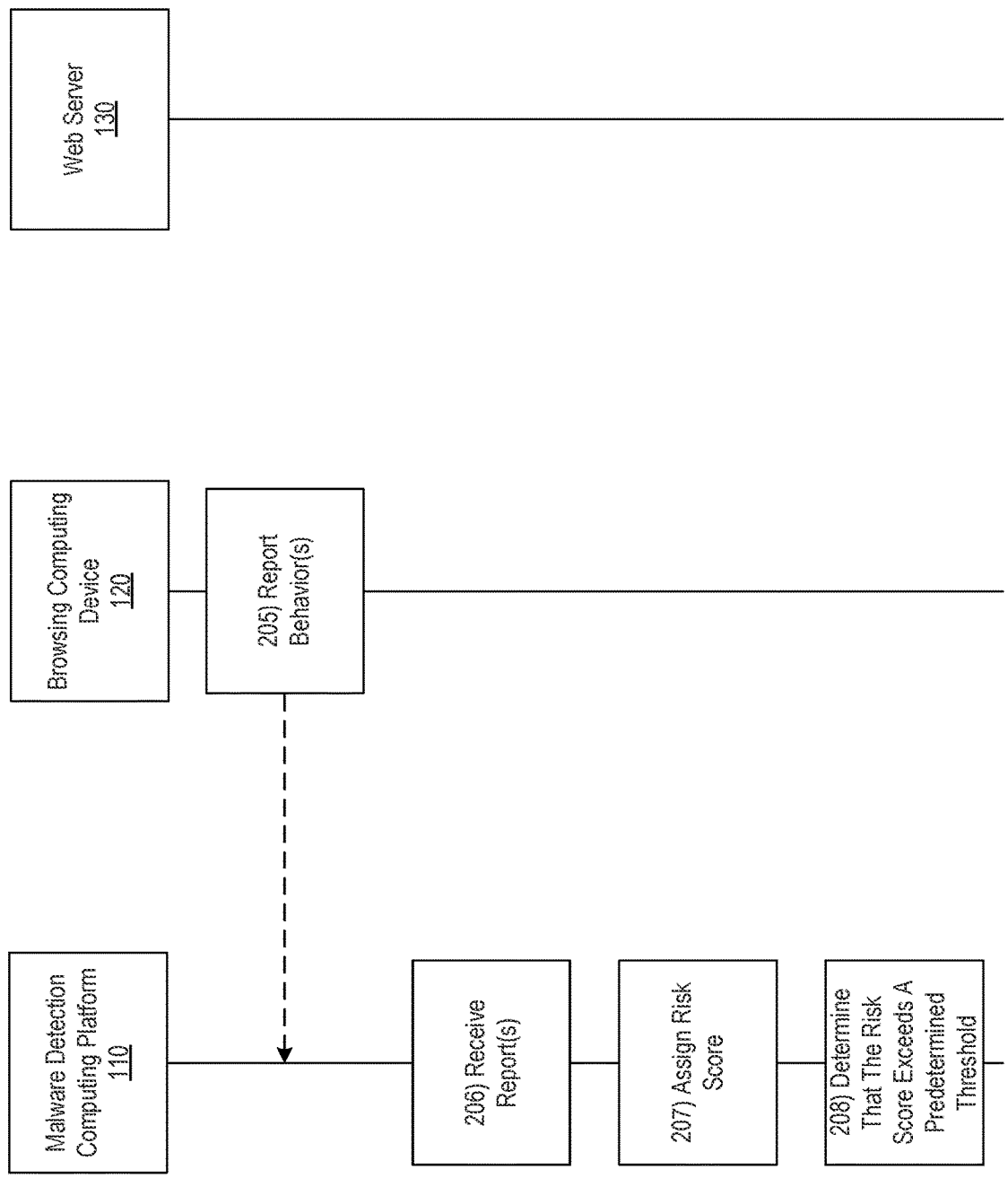

FIGS. 2A-2C depict an illustrative event sequence for malware detection at endpoint devices in accordance with one or more example embodiments. Referring to FIG. 2A, at step 201, malware detection computing platform 110 may send, via a communication interface (e.g., communication interface 113), to a browser extension (e.g., web browser extension 122b) on a computing device (e.g., browsing computing device 120), rule information including a set of rules defining reportable behavior (e.g., anomalous or suspicious behavior) of network traffic associated with a website. For example, the rule information may indicate the type of network traffic that should be blocked.

In turn, at step 202, the malware detection computing platform 110 may cause the browser extension (e.g., web browser extension 122b) on the computing device (e.g., browsing computing device 120) to load the rule information (e.g., from malware detection rules module 112a of malware detection computing platform 110). In some examples, the browser extension (e.g., web browser extension 122b) may load the rule information based on activation and/or startup of a web browser (e.g., web browser 122a).

At step 203, the computing device (e.g., browsing computing device 120) may request and load a website or web page (e.g., provided by web server 130). For example, the computing device (e.g., browsing computing device 120) may access a website using HTTP and/or HTTPS via web browser 122a, and the website may send and receive data from one or more networks (e.g., the Internet).

Subsequently, at step 204, the malware detection computing platform 110 may cause the browser extension on the computing device (e.g., web browser extension 122b) to monitor the network traffic (e.g., network behavior) to and from the website. For example, the malware detection computing platform 110 may cause the browser extension (e.g., web browser extension 122b) on the computing device to monitor outgoing network communications and/or incoming network communications to and/or from one or more web servers (e.g., web server 130). For example, the malware detection computing platform 110 may cause the browser extension (e.g., web browser extension 122b) on the computing device to monitor website traffic for reportable behavior (e.g., anomalous or suspicious behavior). Such reportable behavior may include behavior exhibiting a similarity to a known or suspected malicious behavior. In some examples, the reportable behavior may include connecting to a server in a high-risk country or area where exchange of data is not preferred or considered risky. In some examples, the reportable behavior may include sending data to an unexpected or unknown destination, such as sending sensitive or personally identifiable information (e.g., a user name, password, or other credentials or information) to a third party website that such information should not be forwarded to, or to any destination other than an intended destination. In some examples, the reportable behavior may include sending data insecurely (e.g., unencrypted) over Hypertext Transport Protocol (HTTP) (e.g., rather than Hypertext Transport Protocol Secure (HTTPS)). In some examples, the reportable behavior may include transmitting information using an unspecified security protocol (e.g., when website flags such as Hypertext Transport Protocol Strict Transport Security (HSTS) are not specified). In some examples, the reportable behavior may include setting cookies with wildcard domains (e.g., "*.example.com," which may include "example.com," "a.example.com," "b.example.com," "a.b.example.com," etc.), which may be used to may tamper with data. In some examples, the reportable behavior may include using unsafe keywords (e.g., malicious or potentially malicious keywords) such as "eval," "exec," "open," "file," "input," "import," "execfile," "print," which may include possible harmful or dangerous methods (e.g., inserting malicious code). In some examples, the reportable behavior may include using known vulnerable third-party libraries (e.g., legacy and third-party code/libraries) that may leave websites open to cyberattacks.

Referring to FIG. 2B, at step 205, the browser extension on the computing device (e.g., web browser extension 122b) may generate and send report information associated with the website traffic monitored at step 204 (e.g., a report of suspicious behaviors detected). At step 206, malware detection computing platform 110 may receive, via the communication interface (e.g., communication interface 113) and/or at a report server (e.g., malware detection report module 112b), the report information from the browser extension on the computing device (e.g., web browser extension 122b). In addition, the report information may include an identification of a loaded web page associated with the website that exhibits the reportable behavior defined by at least one rule of the set of rules in the rule information (e.g., loaded in step 202). In addition, the report information may include an indication of which rules of the set of rules (e.g., loaded in step 202) have been met.

At step 207, based on the received report information at step 206, malware detection computing platform 110 may calculate or assign a risk score for the loaded web page identified as exhibiting the reportable behavior defined by at least one rule of the set of rules in the rule information. For example, assigning the risk score for the identified loaded web page may include evaluating a combination of rules of the set of rules indicated as being met or satisfied. For example, malware detection computing platform 110 may calculate or assign a risk score for the identified web page by assigning points for each reportable behavior and then calculating the risk score by adding the points allocated for each reportable behavior.

At step 208, malware detection computing platform 110 may determine that the risk score is above a predetermined threshold. For example, the risk score may be evaluated against a predetermined threshold value to make a malicious website or web page determination. In response to the risk score exceeding the predetermined threshold value, the malicious website determination (e.g., website or web page is untrusted or unsafe) may be confirmed. In response to the risk score remaining within the predetermined threshold value, the malicious website determination may not be made (e.g., website or web page is trusted).

Subsequently, referring to FIG. 2C, at step 209, malware detection computing platform 110 may generate and send, via the communication interface (e.g., communication interface 113), to the browser extension on the computing device (e.g., web browser extension 122b), one or more commands (e.g., a halt command) directing the browser extension on the computing device to close the identified loaded web page being displayed (e.g., by the browser 122a at the browsing computing device 120) and/or stop all outgoing to, or incoming communications from, the website. In turn, at step 210, malware detection computing platform 110 may cause the browser extension on the computing device (e.g., web browser extension 122b) to close the identified loaded web page.

By way of a non-limiting example, malware detection computing platform 110 may assign a value of 50 points to a first rule (e.g., "rule 1," defining a high risk behavior), a value of points to a second rule (e.g., "rule 2," defining a low risk behavior), and a value of 30 points to a third rule (e.g., "rule 3," defining a medium risk behavior). In addition, a predetermined threshold value may be set to a value of 50 points, for example. In this instance, a web page meeting or exhibiting the behavior defined in "rule 1" and "rule 2" may be assigned a risk score of 55 points in total, exceeding the predetermined threshold of 50 points, and therefore may be blocked. Meanwhile, another web page meeting or exhibiting the behavior defined in "rule 2" and "rule 3" may be assigned a risk score of total 35 points in total, remaining within the predetermined threshold value, and therefore may be deemed acceptable and allowed to remain open and running. Additionally or alternatively, a rating or a grading scale other than a points system may be used to calculate the risk score.

Additionally or alternatively, the predetermined threshold may be adjusted and/or may be customizable. For example, the predetermined threshold may be adjusted by malware detection computing platform 110 so as to achieve desired malware detection outcomes. For example, malware detection computing platform 110 may adjust the predetermined threshold based on a particular website being accessed (e.g., one combination of rules reported may be acceptable for a first website, but not acceptable for a second website). In some embodiments, malware detection computing platform 110 may adjust the predetermined threshold using a machine learning algorithm or similar algorithm. Additionally or alternatively, malware detection computing platform 110 may use more than one threshold to assess a level of danger of detected malware (e.g., evaluating the risk score against a first threshold value and a second threshold value). For instance, in some embodiments, a risk score indicating potentially suspicious behavior may not rise to a level that warrants blocking network traffic entirely, but may still warrant high level monitoring (e.g., report to a cybersecurity administrator or the like). In such a case, the malware detection computing platform 110 may cause the browser extension (e.g., web browser extension 122b) on the computing device (e.g., browsing computing device 120) to allow or keep open a web page assigned a risk score over a first threshold value, and deny or close a web page assigned a risk score over a second threshold value). For instance, the second threshold value may be greater than the first threshold value.

Figure 3:
FIG. 3 depict example graphical user interfaces for malware detection at endpoint devices in accordance with one or more example embodiments.

In some embodiments, in sending the one or more commands (e.g. a halt command) to the browser extension on the computing device (e.g., web browser extension 122b) directing the browser extension to close the identified loaded web page, malware detection computing platform 110 may, at step 211, cause the computing device (e.g., browsing computing device 120) to display and/or otherwise present one or more graphical user interfaces similar to graphical user interface 300, which is illustrated in FIG. 3. As seen in FIG. 3, graphical user interface 300 may include text and/or other information notifying the user of the computing device (e.g., browsing computing device 120) of malware detected by the browser extension and/or notifying the user of the computing device (e.g., browsing computing device 120) of actions that can or will be taken (e.g., "The web page you are visiting contains malicious code and may harm your computer. For your safety the web page will now close. [Ignore warning . . . ] [Details . . . ]"). In some embodiments, for example, the source of the risk may be identified and blocked, reported, and/or tagged (e.g., under "Details" in FIG. 3). For instance, the source of the risk may be a botnet that produces and sends malware for damaging computer networks and/or computing devices. It will be appreciated that other and/or different notifications may also be provided.

Additionally or alternatively, in some embodiments, malware detection computing platform 110 may (e.g., prior to sending the rule information at step 201, or at any time during the event sequence depicted in FIGS. 2A-2C) add a rule to or remove a rule from the rule information. In addition, malware detection computing platform 110 may update the rule information based on the addition or removal of the rule and store the updated rule information, thereby providing additional customization features. Custom rules may be received, for example, from client devices (e.g., browsing computing device 120), from an administrator, or from any other suitable source.

Figure 4:
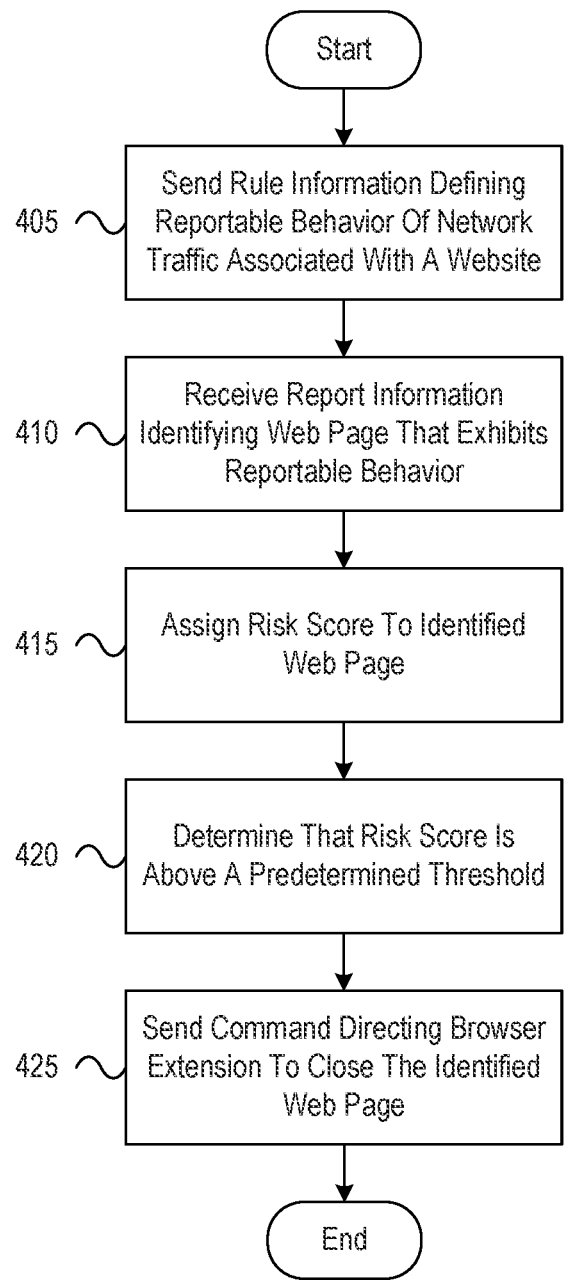
FIG. 4 depicts an illustrative method for malware detection at endpoint devices in accordance with one or more example embodiments.

FIG. 4 depicts an illustrative method for malware detection at endpoint devices in accordance with one or more example embodiments. Referring to FIG. 4, at step 405, a computing platform having at least one processor, a communication interface, and memory may send, via the communication interface, to a browser extension on a computing device, rule information including a set of rules defining reportable behavior of network traffic associated with a website. At step 410, the computing platform may receive, via the communication interface, from the browser extension on the computing device, report information. In addition, the report information may include an identification of a loaded web page associated with the website that exhibits the reportable behavior defined by at least one rule of the set of rules in the rule information. In addition, the report information may include an indication of which rules of the set of rules have been met. At step 415, the computing platform may, based on receiving the report information, assign a risk score for the identified loaded web page. At step 420, the computing platform may determine that the risk score is above a predetermined threshold. At step 425, in response to determining that the risk score is above the predetermined threshold, the computing platform may send, via the communication interface, to the browser extension on the computing device, one or more commands directing the browser extension on the computing device to close the identified loaded web page.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform, comprising:
at least one processor;

a communication interface communicatively coupled to the at least one processor; and memory storing computer-readable instructions that, when executed by the at least one processor, cause the computing platform to:

send, via the communication interface, to a browser extension on a computing device, rule information including a set of rules defining reportable behavior of network traffic associated with a website;

receive, via the communication interface, from the browser extension on the computing device, report information, wherein the report information includes an identification of a loaded web page associated with the website that exhibits the reportable behavior defined by at least one rule of the set of rules in the rule information, an indication that the loaded web page associated with the website is transmitting information using an insecure security protocol, and an indication of which rules of the set of rules have been met;

based on receiving the report information, assign a risk score for the identified loaded web page, wherein the risk score is assigned based on points that are allocated to the reportable behavior exhibited by the website associated with the identified loaded web page;

determine that the risk score is above a predetermined threshold, wherein the predetermined threshold is adjusted for the identified loaded web page; and in response to determining that the risk score is above the predetermined threshold, send, via the communication interface, to the browser extension on the computing device, one or more commands directing the browser extension on the computing device to close the identified loaded web page.

2. The computing platform of claim 1, wherein assigning the risk score for the identified loaded web page comprises evaluating a combination of rules of the set of rules indicated as being met.

3. The computing platform of claim 1, wherein the memory stores additional computer-readable instructions that, when executed by the at least one processor, cause the computing platform to:

cause the browser extension on the computing device to monitor the network traffic to and from the website.

4. The computing platform of claim 1, wherein receiving the report information from the browser extension on the computing device comprises receiving information indicating that the loaded web page associated with the website exhibits a similarity to a known or suspected malicious behavior defined as a reportable behavior by the set of rules.

5. The computing platform of claim 1, wherein receiving the report information from the browser extension on the computing device comprises receiving information indicating that the loaded web page associated with the website is connecting to a server in a high-risk country or area.

6. The computing platform of claim 1, wherein receiving the report information from the browser extension on the computing device comprises receiving information indicating that the loaded web page associated with the website is sending data to an unexpected or unknown destination.

7. The computing platform of claim 1, wherein receiving the report information from the browser extension on the computing device comprises receiving information indicating that the loaded web page associated with the website is sending data over hypertext transfer protocol (HTTP).

8. The computing platform of claim 1, wherein receiving the report information from the browser extension on the computing device comprises receiving information indicating that the loaded web page associated with the website is setting cookies with wildcard domains.

9. The computing platform of claim 1, wherein receiving the report information from the browser extension on the computing device comprises receiving information indicating that the loaded web page associated with the website is using unsafe keywords.

10. The computing platform of claim 1, wherein receiving the report information from the browser extension on the computing device comprises receiving information indicating that the loaded web page associated with the website is using known vulnerable third-party libraries.

11. The computing platform of claim 1, wherein the memory stores additional computer-readable instructions that, when executed by the at least one processor, cause the computing platform to:

cause the browser extension on the computing device to load the rule information upon startup of a browser.

12. The computing platform of claim 1, wherein the memory stores additional computer-readable instructions that, when executed by the at least one processor, cause the computing platform to:

add a rule to or remove a rule from the rule information including the set of rules defining reportable behavior of network traffic associated with the website; and update the rule information based on the addition or removal of the rule.

13. A method, comprising:

at a computing platform comprising at least one processor, a communication interface, and memory:

sending, by the at least one processor, via the communication interface, to a browser extension on a computing device, rule information including a set of rules defining reportable behavior of network traffic associated with a website;

receiving, by the at least one processor, via the communication interface, from the browser extension on the computing device, report information, wherein the report information includes an identification of a loaded web page associated with the website that exhibits the reportable behavior defined by at least one rule of the set of rules in the rule information, an indication that the loaded web page associated with the website is transmitting information using an insecure security protocol, and an indication of which rules of the set of rules have been met;

based on receiving the report information, assigning, by the at least one processor, a risk score for the identified loaded web page, wherein the risk score is assigned based on points that are allocated to the reportable behavior exhibited by the website associated with the identified loaded web page;

determining, by the at least one processor, that the risk score is above a predetermined threshold, wherein the predetermined threshold is adjusted for the identified loaded web page; and in response to determining that the risk score is above the predetermined threshold, sending, by the at least one processor, via the communication interface, to the browser extension on the computing device, one or more commands directing the browser extension on the computing device to close the identified loaded web page.

14. The method of claim 13, wherein assigning the risk score for the identified loaded web page comprises evaluating a combination of rules of the set of rules indicated as being met.

15. The method of claim 13, further comprising:
causing, by the at least one processor, the browser extension on the computing device to monitor the network traffic to and from the website.

16. The method of claim 13, wherein receiving the report information from the browser extension on the computing device comprises receiving information indicating that the loaded web page associated with the website exhibits a similarity to a known or suspected malicious behavior defined as a reportable behavior by the set of rules.

17. The method of claim 13, further comprising:
adding or removing, by the at least one processor, a rule to or from the rule information including the set of rules defining reportable behavior of network traffic associated with the website; and
updating the rule information based on the adding or removing of the rule.

18. The method of claim 13, further comprising:
causing, by the at least one processor, the browser extension on the computing device to load the rule information upon startup of a browser.

19. One or more non-transitory computer-readable media storing instructions that, when executed by a computing platform comprising at least one processor, a communication interface, and memory, cause the computing platform to:
send, via the communication interface, to a browser extension on a computing device, rule information including a set of rules defining reportable behavior of network traffic associated with a website;
receive, via the communication interface, from the browser extension on the computing device, report information, wherein the report information includes an identification of a loaded web page associated with the website that exhibits the reportable behavior defined by at least one rule of the set of rules in the rule information, an indication that the loaded web page associated with the website is transmitting information using an unencrypted security protocol, and an indication of which rules of the set of rules have been met;
based on receiving the report information, assign a risk score for the identified loaded web page, wherein the risk score is assigned based on points that are allocated to the reportable behavior exhibited by the website associated with the identified loaded web page;
determine that the risk score is above a predetermined threshold, wherein the predetermined threshold is adjusted for the identified loaded web page; and
in response to determining that the risk score is above the predetermined threshold, send, via the communication interface, to the browser extension on the computing device, one or more commands directing the browser extension on the computing device to close the identified loaded web page.

20. The one or more non-transitory computer-readable media of claim 19, further including instructions that, when executed, cause the computing platform to:
cause the browser extension on the computing device to monitor the network traffic to and from the website.

* * * * *